(12) United States Patent
Westin

(10) Patent No.: US 7,496,201 B2
(45) Date of Patent: *Feb. 24, 2009

(54) PORTABLE HOST-PLUGGABLE APPLIANCE TRACKING SYSTEM

(75) Inventor: Kenneth Vernon Westin, Portland, OR (US)

(73) Assignee: WestinTech LLC, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,795

(22) Filed: Mar. 7, 2008

(65) Prior Publication Data

US 2008/0301291 A1 Dec. 4, 2008

Related U.S. Application Data

(63) Continuation of application No. 11/823,575, filed on Jun. 28, 2007.

(51) Int. Cl.
*H04K 1/00* (2006.01)
(52) U.S. Cl. .............................. 380/258; 726/2; 726/9; 726/26; 726/34; 709/201; 709/219; 455/403; 455/404.1
(58) Field of Classification Search .................. 380/258; 726/9, 29, 34–35
See application file for complete search history.

(56) References Cited

U.S. PATENT DOCUMENTS 5,898,391 A * 4/1999 Jefferies et al. ............. 340/988

(Continued)

FOREIGN PATENT DOCUMENTS

JP 2002024091 1/2002

(Continued)

OTHER PUBLICATIONS

Unknown author, "USB Drive AutoRun.inf Tweaking", printed from http://dailycupoftech.com/usb-drive-autoruninf-tweaking/ on Jul. 9, 2008, accessible to the public at least as early as Sep. 27, 2006 as evidenced by date of comments to article, pp. 1-47.*

(Continued)

*Primary Examiner*—Kimyen Vu
*Assistant Examiner*—April Y Shan
(74) *Attorney, Agent, or Firm*—Ater Wynne LLP

(57) ABSTRACT

A recoverable data storage apparatus includes a hand-portable housing configured with an input/output (I/O) port presented outwardly therefrom, a data storage means retained within the housing and operatively coupled with the input/output port, and a client agent embodied as device-executable code residing on the data storage device and configured. When executed on a network-linked host computing device, the client agent is configured to establish communication with a remote server and receive data indicating a possession status of the data storage apparatus. A device tracking system includes a data network means, a hardware portion, and a software portion. The hardware portion includes at least, (1) a server device operatively coupled with the network means, and (2) a data storage device with an externally presented input/output port configured to operatively couple with a host device. The software portion includes at least, (1) a data storage device tracking means configured to identify a data storage device based upon unique identification-relevant data included in a polling message received via the network means, and (2) a client agent configured as device executable code stored at a memory means operatively coupled with the data storage device, wherein the client agent is configured so operatively when coupled with a host device to cause the host device to transmit host device-relevant identifying data via the network means.

17 Claims, 7 Drawing Sheets

U.S. PATENT DOCUMENTS

| | | | |
|---|---|---|---|
| 6,128,739 A * | 10/2000 | Fleming, III | 726/35 |
| 6,244,758 B1 * | 6/2001 | Solymar et al. | 709/224 |
| 6,300,863 B1 * | 10/2001 | Cotichini et al. | 340/5.8 |
| 6,433,685 B1 * | 8/2002 | Struble et al. | 340/571 |
| 6,725,379 B1 * | 4/2004 | Dailey | 726/35 |
| 6,804,699 B1 | 10/2004 | Henrie | |
| 6,950,946 B1 * | 9/2005 | Droz et al. | 726/35 |
| 7,233,791 B2 | 6/2007 | Gilbert et al. | |
| 7,242,588 B2 | 7/2007 | Kitsopoulos | |
| 7,272,723 B1 * | 9/2007 | Abbott et al. | 713/185 |
| 2001/0056544 A1 | 12/2001 | Walker | |
| 2004/0203601 A1 * | 10/2004 | Morriss et al. | 455/411 |
| 2005/0131629 A1 | 6/2005 | Ignatin | |
| 2005/0159184 A1 | 7/2005 | Kerner | |
| 2005/0250440 A1 | 11/2005 | Zhou | |
| 2006/0004905 A1 * | 1/2006 | Martino | 709/200 |
| 2006/0112418 A1 * | 5/2006 | Bantz et al. | 726/4 |
| 2006/0195261 A1 | 8/2006 | Riley | |
| 2006/0224742 A1 | 10/2006 | Shahbazi | |
| 2007/0011724 A1 | 1/2007 | Gonzalez | |
| 2007/0103300 A1 * | 5/2007 | Peng | 340/571 |
| 2007/0138999 A1 * | 6/2007 | Lee et al. | 320/107 |
| 2007/0143827 A1 | 6/2007 | Nicodemus | |
| 2007/0143851 A1 | 6/2007 | Nicodemus | |
| 2007/0172064 A1 | 7/2007 | Nonaka | |
| 2007/0197261 A1 | 8/2007 | Humbel | |
| 2007/0198630 A1 * | 8/2007 | Jacobson et al. | 709/203 |
| 2007/0271348 A1 | 11/2007 | Yang | |
| 2007/0283002 A1 * | 12/2007 | Bornhoevd et al. | 709/224 |

FOREIGN PATENT DOCUMENTS

| | | |
|---|---|---|
| JP | 2005295309 | 10/2005 |
| JP | 2007028639 | 2/2007 |
| JP | 2007122457 | 5/2007 |

OTHER PUBLICATIONS

Bruce Schneier, "Schneier on Security: Sony's DRM Rootkit: The Real Story", Nov. 17, 2005, pp. 1-93.*

Mark Russinovich, "Mark's Blog: More on Soney: Dangerous Decloaking Patch, EULAs and Phoning Home", 2005, pp. 1-82.*

Mark Russinovich, "Mark's Blog: Sony, Rootkits and Digital Rights mangemtn Gone Too Far", 2005, pp. 1-253.*

Sung Yang, U.S. Appl. No. 60/747,560, 31 pages, filed May 18, 2006.*

Fossen, E.A., "Principles of Internet Investigations: Basic Reconnaissance, Geopositioning and Public Information Sources," Jun. 13, 2005 http://scholar.google.com/scholar?hl=en&lr=&cluster=7807050719521451010.

Gajparia, Anand S., "On User Privacy for Location-based Services," Ph.D. dissertation, University of London, 2007, Department of Mathematics.

Koodli, R., et al., "Location Privacy with IP Mobility," First International Conference on Security and Privacy for Emerging Areas in Communications Networks, pp. 222-224. DOI.ieeecomputersociety.org/10.1109/Securecomm.2005.44.

Koshima, H., et al., "Personal locator services emerge," in: Spectrum, IEEE, Feb. 2000, vol. 37, Issue: 2, pp. 41-48, INSPEC Accession No. 6501294, DOI: 10.1109/6.819928, Posted online: Aug. 6, 2002 23:49:35.0.

Lim, Yu-Xi, "Secure Geolocation for Wireless Indoor networkds," Apr. 12, 2006, Georgia Institute of Technology, master's thesis, http://hdl.handle.net/1853/11454.

Meyer, Shane, "Laptop Security, a guid to protecting your laptop," Security Essentials GSEC Practical Assignment, Version 1.4b, Option 1, SANS Institute 2003. http://scholar.google.com/scholar?hl=en&q=network+recovery+stolen+flash+drive++-patents&spell=1.

* cited by examiner

US 7,496,201 B2

PORTABLE HOST-PLUGGABLE APPLIANCE TRACKING SYSTEM

RELATED APPLICATIONS

This application is a Continuation of and claims priority to U.S. patent application Ser. No. 11/823,575 entitled APPARATUS AND SYSTEM FOR LOST/STOLEN DATA STORAGE DEVICE RECOVERY and filed on 28 Jun. 2007, and also claims priority to U.S. Provisional Patent Application Ser. No. 60/892,780, entitled USB DEVICE TRACKING SYSTEM and submitted on 2 Mar. 2007, the contents of each of which are incorporated in their entirety herein by this reference.

FIELD OF THE INVENTION

The invention relates generally to the field of recovery of stolen or lost devices. In particular, the invention includes an apparatus and system configured to report a location upon unauthorized use of a data storage device with a network-coupled computing device.

BACKGROUND OF THE INVENTION

Data storage devices have become increasingly portable, while simultaneously increasing in data capacity. Devices such as Universal Serial Bus (USB) flash memory drives can be used interchangeably on virtually any computing system having a USB input/output port. However, portability also increase the opportunity and the likelihood that such devices will be lost or stolen, and high capacity increases the risk that substantial amounts of important data can be lost.

Currently, such devices do not have provisions enabling recovery after loss. Devices such as wrist straps and clips can be attached to portable data storage devices, but once lost, such accessories provide no recovery benefits. Therefore, an owner of a portable data storage device must rely on 1) the kindness and/or consideration of a finder of a lost data storage device to return it, and 2) the data storage device having some indicia sufficient to enable a finder to contact the owner to return the device. The confluence of these two factors provides only a very tenuous basis upon which an owner can expect to recover a lost data storage device.

Additionally, when a data storage device is stolen, there is no expectation at all that the thief's goodwill will lead them to return the data storage device. Truly, the absence of goodwill is generally what created the loss in the first place.

Therefore, the current state of the art provides no affirmative means by which an owner can expect to recover a lost or stolen data storage device, along with potentially large amounts of valuable, private data contained thereupon.

DETAILED DESCRIPTION OF THE PREFERRED EMBODIMENTS

A system configured for recovering a data storage device, as well as its structural and functional components, is described herein. In general terms, a system according to an embodiment includes a server operatively coupled with a host device via a network means, and also includes a data storage device. When a data storage device that has been lost or stolen is operatively coupled with a host device, a client agent of the data storage device causes the host device to transmit a polling message via the network means to the server, the polling message including identity-relevant data of the data storage device. The server associates the identity-relevant data with corresponding stored possession-relevant data of the data storage device, and transmits a response including the possession-relevant data to the data storage device. If the possession-relevant data indicates a lost or stolen possession status, the data storage device causes the host device to transmit a message including identity-relevant data of the host device to the server. The server then associates the host device identity-relevant data with geolocation data of the host device, and transmits at least the geolocation data to either or both of the data storage device owner or a security agency. Thereafter, the geolocation data can be utilized to recover the data storage device.

The above description, while provided to convey a basic conceptual understanding of embodiments of the invention, is highly generalized, and in no way limits the scope of alternative embodiments. To provide an improved understanding of numerous embodiments of the invention, the system and individual apparatuses involved therein are described below in substantial detail with reference to the figures.

Figure 1:
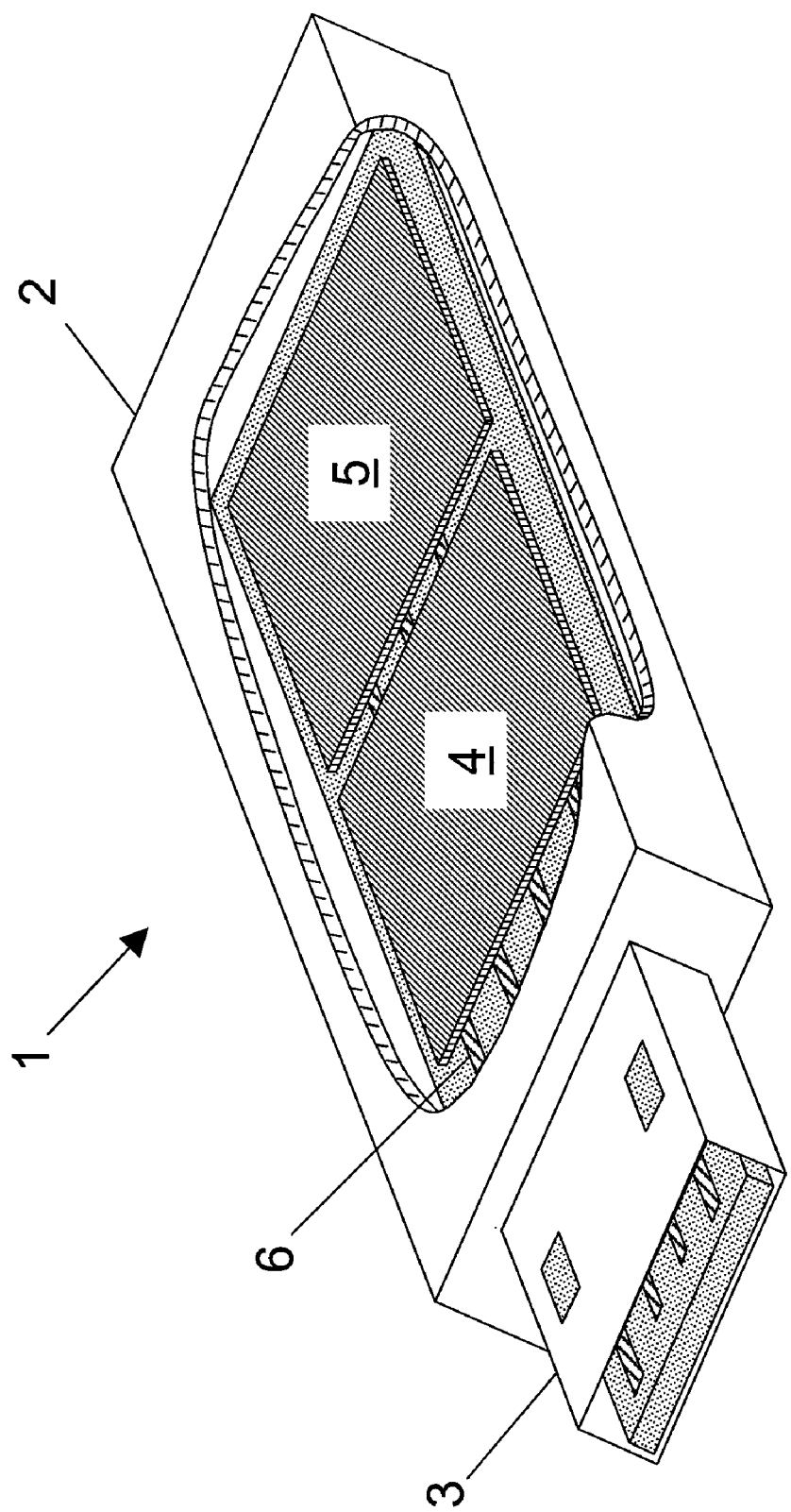
FIG. 1 depicts in isometric view a recoverable data storage device, with cut-away exterior portions to enable a view of interior portions, according to an embodiment of the invention.

FIG. 1 generally depicts a recoverable data storage device 1 according to a typical embodiment of the invention. The storage device 1 includes a housing 2 sized and configured to render the storage device 1 hand-portable, enabling a user to carry the storage device 1 relatively unobtrusively on their person. The material comprising the housing 2 will generally include one or more polymer (e.g., plastic) materials, but can also or alternatively include other materials (e.g., metal, etc.). The housing 2 will generally include an internal cavity, and thus will possess an outer surface and an inner surface, the latter being presented to the cavity. However, in embodiments, the housing may have a relatively solid configuration, with no internal cavity or inner surface, or only having only incidental (e.g., air trapped during assembly) and/or insubstantial cavities.

Presented outwardly at an external surface of the housing 2 is one or more electrically conductive contacts configured as an input/output (I/O) port 3, and also configured to operably couple with corresponding contacts and/or an I/O port of a host device. Such coupling provides (e.g., forms) an electrically conductive pathway between the storage device 1 and a host device for transfer of electrical data-bearing signals therebetween. Additionally, such coupling typically provides a relatively stable yet easily separable physical connection between the storage device 1 and a host device, and provides the storage device 1 as an additional data storage resource of the host device so coupled. In embodiments, electrical contacts of a storage device 1, while providing a means for establishing an operative coupling (e.g., electrically conductive pathway) with corresponding contacts of a host device, may not by themselves provide a stable physical connection. Rather, one or more retention features of the storage device 1 (e.g., a detent, notch, hook, etc.) and/or the host device (e.g., a latch, catch, etc.) may be present and provide for such stable physical connection. In yet other embodiments, an I/O port 3 of a data storage device 1 may not couple directly with an I/O port of a host device, but rather may be coupled with the host device by an interconnecting cable, or even by a wireless (e.g., optical, radio-frequency, etc.) data communication interface. In the latter embodiment, a host device can be configured to recognize and exchange data with a data storage device 1 when the data storage device 1 enters and/or remains within transmission/detection range of the host device.

The embodiment of FIG. 1 depicts an I/O port 3 configured as a universal serial bus (USB) port, although the embodiments are not so limited, and can alternatively be configured as other I/O port types (e.g., IEEE 1394, a receptacle for a memory card device, and others) and provide substantially similar function and benefits. Further, while FIG. 1 depicts an I/O port 3 projecting from the housing 2, an I/O port 3 need not be so configured. Rather, the I/O port 3 may reside wholly within an outer perimeter of the housing 2, while remaining outwardly presented and accessible for operatively coupling with a corresponding I/O port 3. In wireless embodiments, an I/O port 3 can include an antenna or other radio-frequency signal conveying means, or an infrared emitter or other optical signal conveying means, although the embodiments are not so limited.

Retained within the housing 2 and operably coupled with the I/O port 3 is at least one data storage means 4. Generally, a data storage means 4 of an storage device 1 comprises a packaged, solid-state, non-volatile memory device, such as a standard EEPROM chip or a flash (e.g. NOR, NAND, charge trap) memory chip, although the embodiments are not so limited. Alternative embodiments contemplate data storage means 4 including a hard disc drive comprising magnetically readable media, an optical data storage device comprising optically readable media, and/or others as known or reasonably contemplated. Data storage means 4 according to alternative embodiments can vary in physical size (e.g., dimensions), data storage capacity, package type (e.g., ball grid array (BGA), thin, small-outline package (TSOP), etc.), package material (e.g., polymer, ceramic, etc.), or other characteristics as known or contemplated in the art.

Further, data storage means 4 can include portions at which stored data can be deleted or over-written, while also including portions at which stored data is substantially protected from alteration such as by deletion or over-write actions. For example, substantial protection may be provided by encryption requiring entry of a pre-set code prior to alteration. Alternatively, a protected portion of the data storage means 4 may be designed and/or constructed to not allow data storage and/or alteration without the use of equipment and/or methods not normally available to the general public or without rendering the device non-functional.

Data storage means 4 is typically but not exclusively fixed in a condition of positional stability with a substrate, such as a printed circuit board (PCB) in embodiments. Electrically conductive pathways 6 may be formed on or within the substrate, such pathways 6 being operatively coupled at one of a plurality of ends with electrically conductive features (e.g., pads, balls, pins, leads, etc.) presented at or beyond an outer surface of the data storage means 4. Another end of at least a subset of the pathways 6 is operatively coupled with the I/O port 3, enabling passage of electrical signals between the I/O port 3 and the data storage means 4. Therefore, when an I/O port 3 of a recoverable data storage device 1 is operatively coupled with a corresponding I/O port of a host device, electrical signals can be transferred between the data storage device 1 and the host device.

As shown in FIG. 1, a recoverable data storage device 1 may include one or more additional devices 5 operatively coupled with the data storage means. Such additional devices can include, for example, an additional data storage means or a microcontroller, although the embodiments are not so limited.

Figure 2:
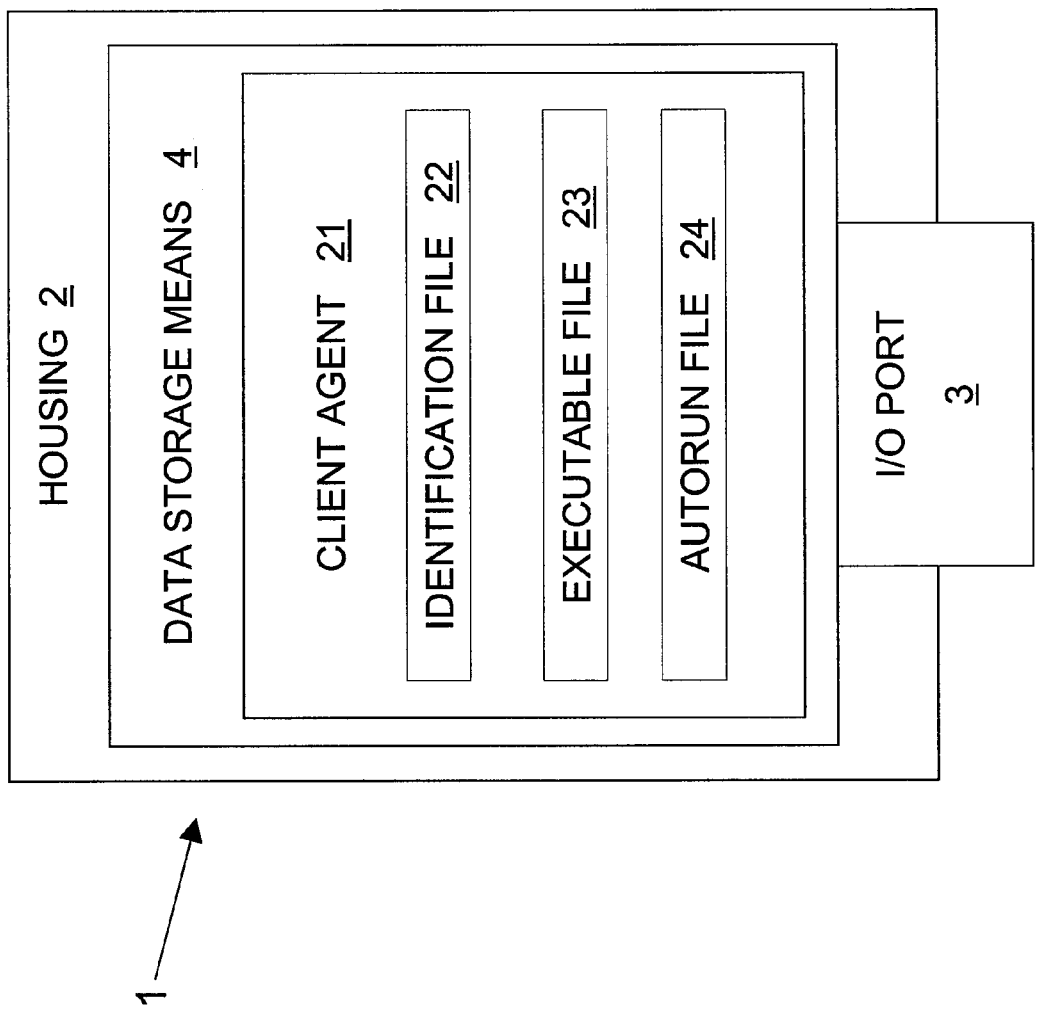
FIG. 2 depicts in block diagram form a recoverable data storage device according to an embodiment of the invention.

FIG. 2 is a relational block diagram substantially depicting the embodiment of a recoverable data storage device 1 show in FIG. 1, including a housing 2, an I/O port 3, and a data storage means 4, substantially as described above. As shown, the data storage means 4 is configured to include a client agent 21. The client agent 21 is typically, but not exclusively, embodied as device-executable code residing (i.e., stored) at the data storage means 4. The client agent 21 can execute when purposefully accessed by a user of an operatively coupled host device, or may execute automatically, such as by simply operatively coupling the data storage device 1 with a functioning host device. As an example of the latter, many host devices are configured to query and attempt to identify an operatively coupled device (e.g., a USB device). A client agent 21 can be configured to execute in response to such query.

The client agent 21 typically, but not exclusively, includes one or more individual data files. In a typical embodiment, these files can include an identification file, and executable file, and/or an autorun file. An identification file 22 typically includes data storage device-relevant identification data. Such data can include (but is not limited to) a unique serial number for the data storage device 1, information identifying the owner of the data storage device 1 (hereinafter, registered owner), and/or other such data generally capable, individually or collectively, of uniquely identifying a recoverable data storage device 1 to the exclusion of all others. The identification file 22 can also be accessed and executed on, for example, a computing device, causing a visual representation of the data storage device-relevant identification data to be presented at a display device operatively coupled with the computing device.

The identification file 22 and data contained therein can also be accessed by an executable file 23 also typically included as a component of a client agent 21. The executable file 23 is a file that can be accessed at the data storage device 1 and run by or on a computing device, such as a host device of an unauthorized user of the data storage device 1. Executable files 23 are typically assigned designations (i.e., file names) ending in file extensions such as ".exe", ".bat", or ".com", for example. Because embodiments of the invention contemplate that the client agent 21 might be executed on or by an unauthorized user, an embodiment contemplates assigning to the executable file a file name configured to induce an unauthorized user to select and execute the file. For example, an executable file 23 which is visible to an unauthorized user via a host device can be configured with the file name "passwords.exe". An unscrupulous user may be induced by the suggestion that the file contains passwords, potentially providing access to valuable subject matter and/or assets of the registered owner or others. He/she will therefore be induced to select the executable file 23, causing the executable file 23 to run on the host device.

The executable file 23 will, however, more typically be executed simply by a routine action by the host response rather than a deliberate selection by an unauthorized user.

For example, a client agent 21 will typically (but not exclusively) include an autorun file 24 (i.e., autorun.inf file). When a data storage device 1 client agent 21 including an autorun file 24 is operably coupled with a computing device, the autorun file 24 triggers an autoplay feature in resident computing device operating software, for example numerous versions of MICROSOFT WINDOWS. The autorun file 24 contains information defining actions the computing device should take with regard to the client agent. In particular, the autorun file 24 directs the device to run the executable file 23. Therefore, in what is contemplated as the more typical (although not an exclusive) situation, the executable file 23 of the client agent 21 is run without requiring a deliberate selection thereof by an unauthorized user.

In an embodiment, executable code of the client agent can be represented as pseudocode. For example:

```
Open current drive in Windows Explorer.
Open "ID" file and read in device ID.
If the ID file does not exist, provide error message "ID file not found, this file must be on the device" and exit.
Get environmental variables: username, computername, internal internet protocol address.
Attempt to create an Internet Explorer (IE) object.
If IE object creation successful, hide the browser window and go to the secure URL passing the devicekey (from the ID file) to the server to check status.
Read in the possession status response from the server.
If the device is flagged as lost or stolen, send back environmental data as parameters in a query string.
Check for other server messages such as if a custom message prompt is to appear or if the user is to be sent to a URL.
If the IE object creation failed, or was not able to make a connection to the server, create own (TCP/IP/IP) connection.
Select a random port and attempt to connect with device key. If connection is successful, then follow same steps as above.
If IE object creation is not successful and customer TCP/IP connection cannot be made, then exit the program.
Delete any files written to device during server communication.
```

A client agent 21 of a recoverable data storage device 1 can include files in addition to an identification file 22, an executable file 23, and an autorun file 24, but at least these three are typically present in an embodiment of the invention.

Figure 3:
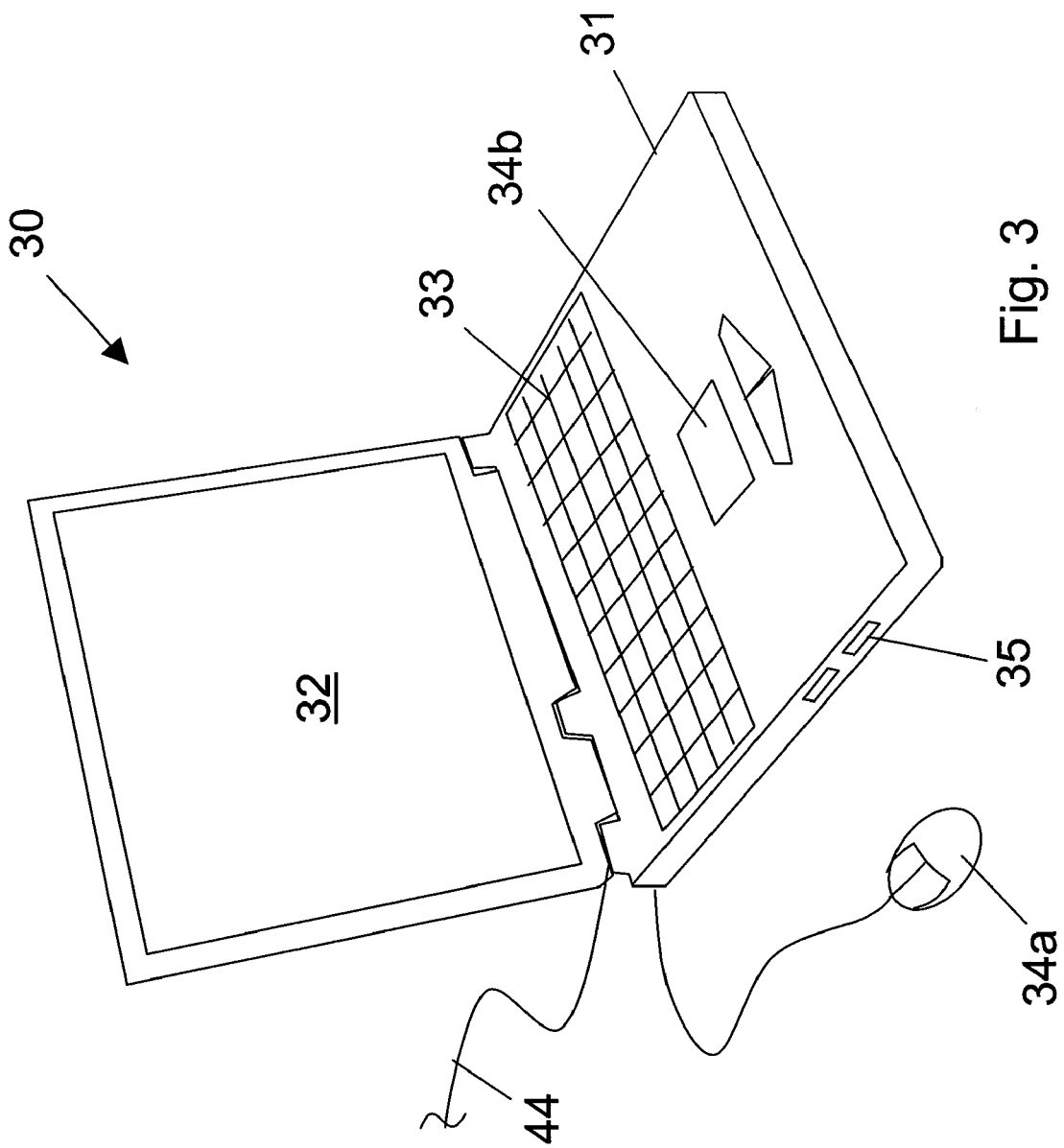
FIG. 3 depicts in isometric view a host device according to an embodiment of the invention.

As described, an I/O port 3 of a recoverable data storage device 1 is configured for operatively coupling with a host device 30, such as that depicted in FIG. 3. A host device 30 can be a relatively stationary or mobile computer, including desktop, notebook, and server computers, personal digital assistants (PDA), tablet computers, operating system (OS) equipped cellular phones, or other similar computing devices, although the embodiments are not so limited. Electronic entertainment systems such as game playing systems, digital video and/or audio recorders and/or players, and others may also be a host device 30. Generally speaking, a host device 30 according to embodiments of the invention can be nearly any device configured to operatively couple with and read data stored at a data storage device 1 and configured to operatively couple (e.g., whether via a wired or wireless router) with a network means 44.

Generally, a host device 30 includes a body portion 31 housing an arrangement of components configured to enable a variety of complex operational functions, and a display means 32 configured to visually display a result (output) of host device-executed operations to a user. Display means 32 typically comprise, for example, a cathode ray tube (CRT) display, a liquid crystal display (LCD), or a plasma display, but the embodiments are not so limited. For example, display means 32 can include any devices configured to display output to a user, such as printers, audio speakers, and others as known in the art.

A host device 30 typically also includes one or more input means such as a keyboard 33 for data input, or a mouse 34a and/or touch sensitive pad 34b for interacting with a graphical user interface (GUI). Other input means, such as microphones, scanners, accommodation devices for users with disabilities, and others as known in the art may also be included. A host device 30 will generally be configured to include one or more user-accessible I/O ports 35, at least one of which is configured to correspond and operatively couple with an I/O port 3 of a data storage device 1. A user-accessible port 35 normally be externally presented from the host device 30, but may also be retain entirely within a body portion 31 of the host device 30 and be accessible by opening (or removing) an access member (e.g., lid, door, flap, etc.). Also, as described with regard to a data storage device 1, an I/O port of a host device can also be configured in wireless embodiments so as to transfer a wireless signal with a corresponding I/O port 3 of a data storage device 1, and will be configured for at least one of optical, radio-frequency, or another form of wireless signal conveyance.

Figure 4:
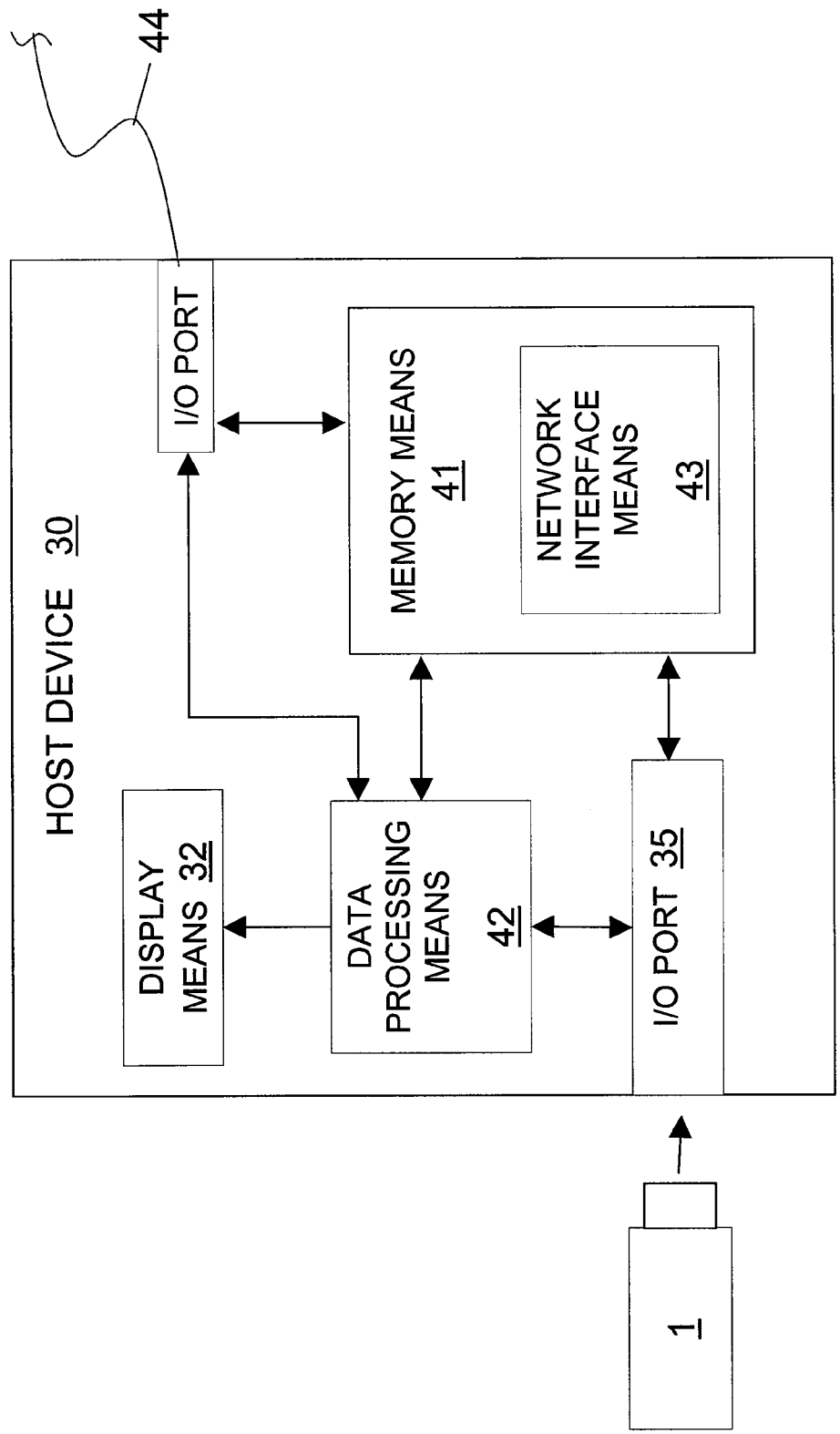
FIG. 4 depicts in block diagram form a host device according to an embodiment of the invention.

FIG. 4 depicts functional elements of the host device embodiment of FIG. 3 as a relational block diagram. I/O port 35 operatively couples with one or more functional components of the host device 30 such as a memory means 41 (e.g., hard drive, dual in-line memory module, and/or others), a data processing means 42 (e.g., integrated circuit devices such as microprocessors, chipsets, graphics engines, and/or others), power regulating components and circuits, and network interface means 43 (e.g., network interface cards, and/or others), although those listed here do not constitute an exclusive list.

A network interface means 43 can also include device-executable code stored at a memory means 41. For example, a network interface means 43 (hereinafter, browser 43) can include internet browser software, such as MICROSOFT INTERNET EXPLORER, NETSCAPE NAVIGATOR, MOZILLA FIREFOX, or another software compilation configured to interface with and/or facilitate data transfer (e.g., whether via a wired or wireless router) via a network means 44. Browsers 43 such as those listed are typically configured to process network-transferred data and present a result to a user as a GUI at a display means 32 of the host device 30. However, according to embodiments, executing a client agent 21 will cause a browser 43 to access and transfer data via a network means 44 stealthily (e.g., clandestine), without displaying to a user a visible indication of such access and transfer at the display means 32. Typically, a client agent 21 will attempt to establish a http (hyper-text transfer protocol) connection with a remote server via a browser 43 of the host device 30. However, if a connection cannot be established via the browser 43, a client agent 21 is further configured to establish a connection with a server via a random I/O port of the host device 30.

When initially executed following operative coupling with a host device 30, client agent 21 is configured to cause the host device 30 to transmit a client agent-specified polling data transmission. A polling message typically includes data directing the message to one or more remote servers, described below in more detail. A polling message will also include identification-relevant data corresponding to the data storage device 1, and also including data corresponding to a location at which the data storage device 1 can receive data transmitted by the server in response to the polling message.

Although a typical embodiment includes the client agent 21 establishing stealthy (e.g., clandestine) access to and control of the host device 30 browser 43 to transmit a polling message, in other embodiments, the client agent is not to be configured for stealthy control, or is so configured but to act stealthily only when specific conditions are present. For example, according to an alternate embodiment, executing the client agent will cause a prompt to appear at the display means 32 of the host device 30. The prompt can serve to inform the user of the host device 30 that their use of the data storage device 1 is unauthorized or to provide contact information to aid in returning the data storage device 1 to its registered owner, or to inform them that their geolocation data has been transmitted to a security agency and/or law enforcement entity. Such prompts may encourage an unauthorized user of the data storage device 1 to proactively attempt to return the device, and could, in embodiments, be custom configured by a registered user or other authorized entity.

Alternatively, rather than a causing a prompt to appear, or perhaps in addition to a prompt, an executed client agent 21 can cause the host device 30 to open a browser window at the display means 32 and can cause the browser 43 to navigate to a predetermined internet presence (e.g., webpage, URL address, etc.). The internet presence can be predetermined by including data corresponding to the internet presence in the code of the client agent 21, or by another method.

Generally, any reference herein to the client agent 21 causing the host device 30 to perform an action also implies an interaction between the client agent 21 and the data processing means 42 of the host device 30. This is due to the client being configured as device-executable code and the data processing means 42 typically being configured to execute such code. Such execution typically causes the data processing means 42 to perform one or more actions designated for execution by the client agent 21 and/or by the presence of certain pre-specified conditions (e.g., receipt of data indicating a lost or stolen possession condition of a data storage device 1). Therefore, the client agent 21 is configured in embodiments to assert control over one or more functions and/or functional components of the host device 30, causing the host device 30 to perform tasks and/or operations without the intervention of a user of the host device 30.

Figure 5:
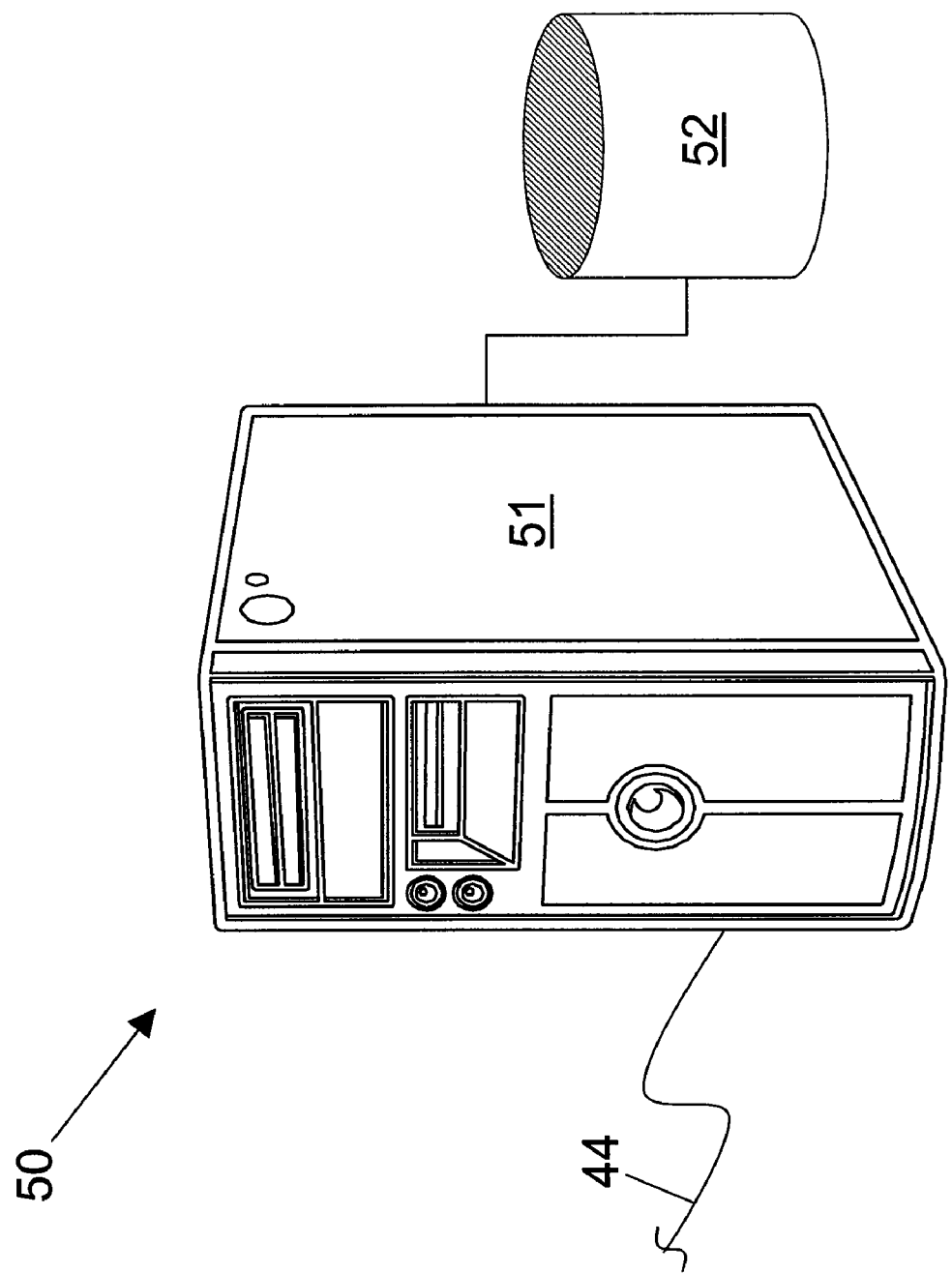
FIG. 5 depicts in perspective view a server portion according to an embodiment of the invention.

As indicated above and as depicted in FIG. 5, a server portion 50 is also operatively coupled with a network means 44 and configured to receive data transmitted thereby. The server portion generally includes a server device 51 operatively coupled with a memory means 52. A server device 51 can be any device typically operated as and/or recognized as a server by those skilled in the art. This could include, for example, a desktop computer configured and used as a server, as well as highly integrated server systems employing large numbers of individual server modules (e.g., blades). Therefore, it should be understood that a server 51 according to embodiments of the invention encompasses a broad rather than narrow scope.

Generally, a server 51 is a device and/or software program that responds to commands and/or data from a client. Therefore, a server device may be such only or primarily by virtue of being configured with server software code stored at a memory means, the code being executable by the device. This understanding should also indicate that the conceived embodiments of a server device are indeed broad rather than limited. The memory means 52 can be integrated with or within (e.g., a hard disk drive, an optical drive configured with data writing capabilities, solid-state digital memory devices, and/or others as known in the art), the server or can be an external data storage device maintained operatively coupled with but relatively separately from the server device.

Figure 6:
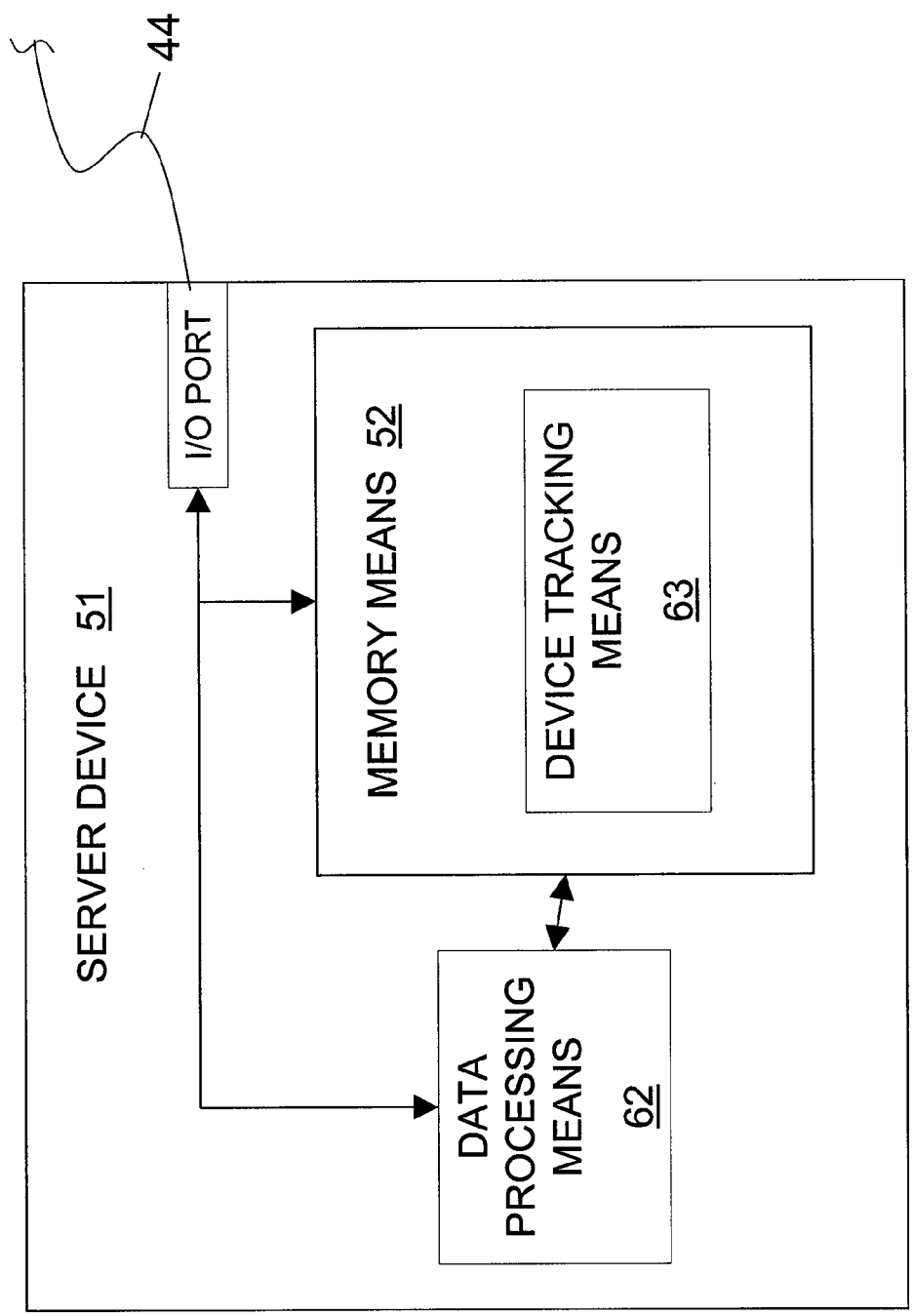
FIG. 6 depicts in block diagram form a server portion, according to an embodiment of the invention.

With reference to FIG. 6, a server device 51 typically includes a data processing means 62 configured to operate upon and/or in response to data received at the server device. A data processing means 62 of a server device can include any of those described with regard to a data processing means 62 of a host device 30, although a data processing means of a server device 51 can be configured (e.g., designed, constructed, etc.) differently from that of a host device 30 to meet different functional requirements or reliability standards, for example. Further, a server device 51 can utilize a substantial plurality of data processing means 62, so embodiments are not limited to a single data processing means 62, although such is referred to in the singular herein for convenience.

The memory means 52 of the server device 51 also includes a portable data storage device tracking means 63 (hereinafter, tracking means). The tracking means 63 is generally configured as device-executable code configured to associate data storage device-relevant identification data with corresponding data storage device possession status-relevant data stored at the memory means 52. For example, when a registered owner or other person having an interest in a data storage device 1 discovers the same missing, he can report the lost and/or stolen possession status of the data storage device 1, and the server device 51 is configured to receive and store at the memory means 52 data corresponding to the possession status assigned to the data storage device 1.

The tracking means 63 is generally also configured to cause the server device 51 to transmit data indicating a possession status of a data storage device 1 in response to receiving a polling message initiated by a data storage device 1 operatively coupled with a host device 30. In an embodiment, in addition to transmitting data indicating a possession status, the server device 51 may also transmit data corresponding to a predetermined internet presence so that the client agent can cause the host device 30 browser 43 to navigate to the internet presence.

Generally, any reference herein to the tracking means 63 causing the server device 51 to perform an action also implies an interaction between the tracking means 63 and the data processing means 62 of the server device 51. For example, device-executable code of the tracking means 63 executing on or by the data processing means 62 will, in embodiments, cause the data processing means 62 to access and retrieve data separately stored at the memory means 52, configure such data for transmission via a network means 44, and transmit the data.

If the data storage device 1 possession status-relevant data indicates the storage device 1 has not been lost or stolen, the client agent causes the host device 30 to delete any files created during communication with the server device 51 and ceases execution. However, if the possession status-relevant data indicates that the storage device 1 has been lost or stolen, and such status received at the storage device 1, the client agent 21 is configured to cause the host device 30 to transmit host device-relevant identification data (hereinafter, environmental data) to the server device 51 as parameters in a querystring. Host-device-relevant identification data can include any one or more of a public IP address corresponding to the host device, a username of a user of the host device, an owner of the host device, an internal network address for the host device, a physical location identifier for the host device, a proprietary network node address for the host device, and a telephonic access number corresponding to the host device location. However, this is not an exclusive listing, and other types of environmental data may also be transmitted.

Upon receiving the environmental data, the tracking means 63 is configured to associate the identification-relevant data with data indicating geolocation data or other host device location-relevant data of the host device 30. To do this, the tracking means 63 will typically access a geolocation means. For example, a geolocation means can be a data source including cross-referencing means (e.g., a database) configured to identify geolocation or other data corresponding to at least a portion of the host device-relevant identifying data. Geolocation or other data can include one or more of a physical location, a host name, a host device owner, a username of a host device user, or a public IP address owner, although this does not constitute an exclusive list. Such geolocation means can also reside as device (e.g. server, computer, etc.) executable code stored at the memory means 52 of the server device 51, but may also reside separately (e.g., at a separate server device or other data source) and be accessed by the server device 51 via a network means similar to network means 44.

A server device 51 according to an embodiment of the invention is also configured to store at a memory means 52 of the server 51a record of received environmental data and portable data storage device-relevant identification data. A record can also include associated geolocation data relevant to the host device. Further, such stored data in a record can be associated with time and date data corresponding to the receipt and/or transmission of such data. One having ordinary skill in the art will appreciate that such records provide evidentiary benefits useful for recovering a lost or stolen data storage device 1, as well as other similar devices recoverable according to alternative embodiments of the invention.

Once the tracking means 63 associates geolocation or other data with host device identification relevant-data, the tracking means 63 typically causes the server device 51 to transmit to a receiving apparatus of a registered owner, and/or to another authorized entity, data indicating a geolocation of the host device 30, as well as other host device-relevant data. For example, the tracking means 63 may transmit data obtained from, or a link to, YAHOO! MAPS or another commercial mapping service. The data may be a map with an indicator of the host device location superimposed on the map, and including textual address information. Alternatively, the data is global positioning system (GPS) coordinates or similar information, and the user device is configured to assist user navigation using such coordinates and/or information. One having ordinary skill will appreciate that embodiments of the invention can include one or more of various sources and types of geolocation information. A receiving apparatus of registered owner can be any device configured to receive data transmitted by a server device 51 and to present such data to the registered owner in a cognizable form.

Further, the data tracking means 63 can also cause the server device 51 to transmit to a receiving apparatus of a security agency and/or a law enforcement entity data similar to or the same as that transmitted to the registered owner. As with the receiving apparatus of a registered owner, a receiving apparatus of a security agency and/or a law enforcement entity can be any device configured to receive data transmitted by a server device 51 and to present such data in a cognizable form. With such data in possession, a registered owner and/or law enforcement entity can establish contact with a registered owner or other entity having control and/or possession of the host device 30 and can pursue recovery of the data storage device 1.

The invention includes, in embodiments, a system configured to include a data network means, a hardware portion, and a software portion. For example, a hardware portion can include a server device operatively coupled with a network means and a data storage device configured with an externally presented input/output port to operatively couple with a host device. A software portion can include a data storage device tracking means stored as server device-executable code at a memory means operatively coupled with a server device. The tracking means can be configured to identify a data storage device based upon unique identification-relevant data included in a polling message received via a network means. Additionally, the software portion can include a client agent stored as device executable code stored at a memory means operatively coupled with the data storage device. The client agent can be configured operatively to cause a host device to transmit host device-relevant identifying data via a network means when coupled with a data storage device.

Figure 7:
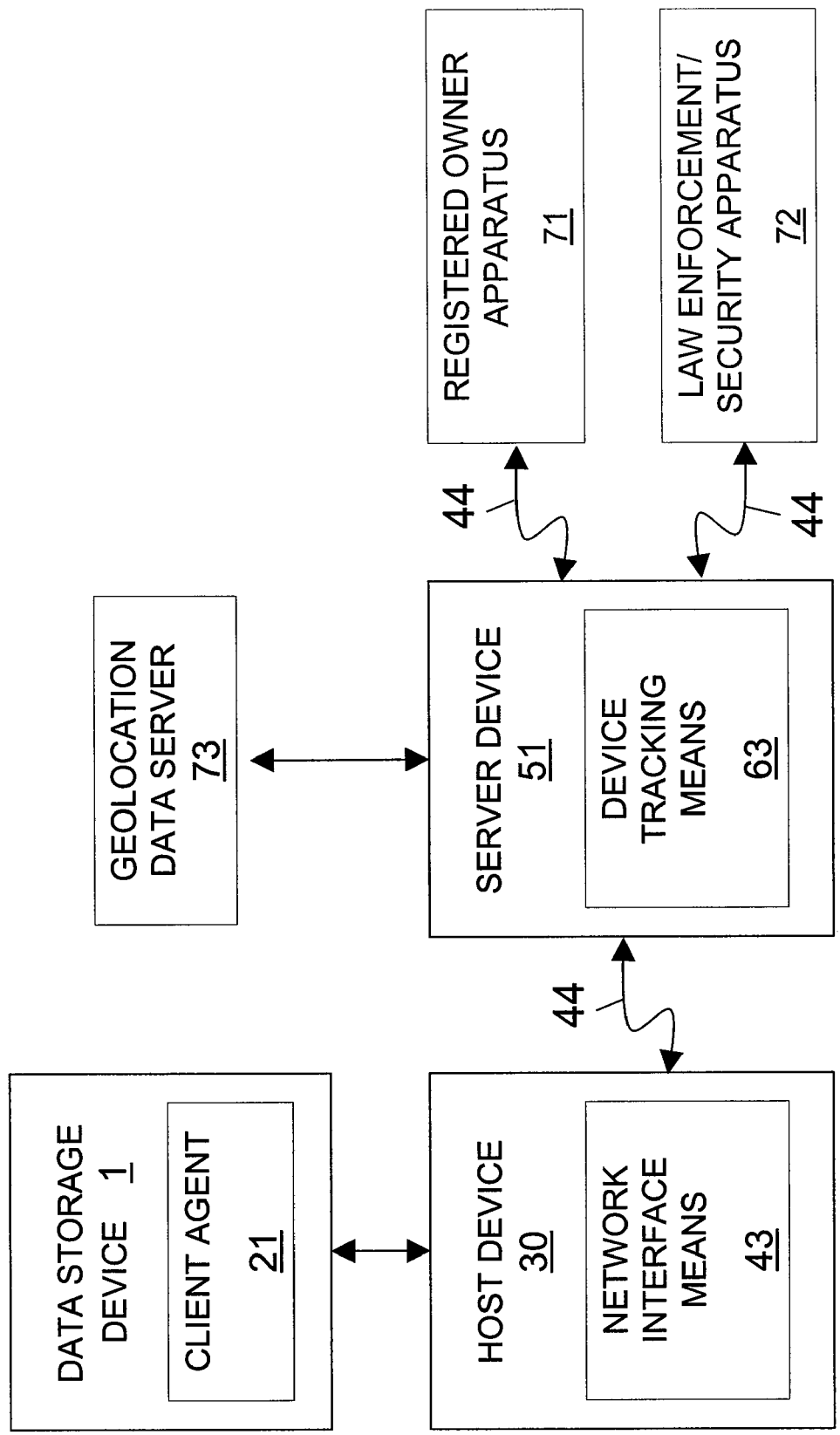
FIG. 7 depicts in block diagram form a system for recovering a portable data storage device according to an embodiment of the invention.

Alternatively, as one having ordinary skill in the art will appreciate and as depicted in FIG. 7, a system for recovering a lost or stolen data storage device can include a network means 44, a server 51, a portable data storage device 1, a client agent 21, and a tracking means 63, or some combination and/or subset thereof as described herein. Further, any and/or all of the above can be configured according to one of the numerous alternative embodiments described herein and/or reasonably understood from the descriptions provided above. Additionally, embodiments of a system further include one or more of a host device 30, a network interface means 43 operatively coupled with a host device, a receiving apparatus 71 of a registered owner or a receiving apparatus 72 of a security agency or law enforcement entity, and another server 73, although the embodiments are not so limited. In a broad sense, the conceived embodiments can include any device, apparatus, means, software, mechanism, configuration, port, or other structurally and/or functionally embodied element described herein. One having ordinary skill will appreciate that explicitly listing each and every embodiment herein would tend to obscure the thrust of the invention by prolixity.

To that end, numerous exemplary embodiments described above include specific references to types and/or configurations employed to simplify the description. Such 'shorthand' references are not, however, intended to limit the scope of the conceived embodiments overall or within a specific reference where used. For example, although an I/O port 35 of a host device 30, configured to operatively couple with a recoverable data storage device 1, is conveniently referred to as a USB port herein, such reference is for simplicity and clarity only, and is not intended to imply or impart restrictions to the broad scope of port types as contemplated in alternative embodiments of the invention. For example, a large variety of data storage devices configured as cards are known and used in a large variety of electronic devices. Examples of data storage card devices include form-factors known as CompactFlash, Secure Digital, MultiMediaCard (MMC), Secure Digital High Capacity (SDHC), and others known and/or contemplated in the art, each of which is also contemplated within the scope of the inventive embodiments described herein. Additionally, nearly any integrated electronic device devices configured to include at least one memory device, and having an I/O port configured to operatively couple with a host device (e.g., a portable audio player, a portable digital assistant, etc.), is also contemplated within embodiments of the invention. Therefore, the scope of the invention is broadly inclusive rather than narrowly limited.

Likewise, reference to a network interface means 43 embodied as device executable code as a "browser" is not intended to restrict the broad scope of contemplated network interface means to those commercially and/or commonly referred to as browsers, whether wired or wireless. Rather, any network interface embodied as device executable code is within the scope of the invention according to alternative embodiments.

Likewise, any reference herein to a network means 44 can include devices (including routers, switches, hubs, modems, integrated circuit devices, card-based devices such as network interface cards, etc.), media, structures (e.g., antennae, signal relays, satellites etc.), systems, and/or computer-executable code configured for data transmission, such as between one device and another, although the conceived network means are not necessarily limited to those listed here. Network means can also include media for transmitting data wirelessly, or for transmitting data via optically and/or electrically conductive media (e.g., optical fibers and/or copper wire, respectively, etc.), or I/O ports providing access for data transmission to or from a device.

Further, while in a typical embodiment a data storage device will operatively couple directly with a host device, embodiments also contemplate a data storage device operatively coupled with another (intervening) device that is not itself capable of operatively coupling directly with a network (e.g., a digital camera, a digital picture frame, etc.). However, when the intervening device is operatively coupled with a host device, and the host device is operatively coupled (whether wired or wirelessly) with a network means as describe herein, the host device can execute a client agent of the data storage device as described herein. Therefore, the presence of an intervening device between a data storage device and a host device is contemplated in alternative embodiments within the scope of the invention, whether or not separately and/or specifically referred to in the claims.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

Embodiments of the present invention provide a means for portable data storage device to establish communication with a device tracking means and determine whether the device has been reported as lost or stolen when files on the device are executed by a host device. Further, the present invention enables such communication to be stealthy (e.g., clandestine), not alerting a user of the host device that the communication is taking or has taken place.

Embodiments of the present invention enable a registered owner of a portable data storage device to report a lost or stolen possession status of a data storage device. Further, upon transmission of such information to a client agent of a portable data storage device, the client agent causes an operatively coupled host device to transmit its own identifying data to a device tracking means.

Additionally, a device tracking means can be configured to associate host device-identifying data with geolocation data relevant to the host device, and transmit the geolocation data to a registered owner of the data storage device, or to one or more of a law enforcement entity and/or a security agency, therefore aiding recovery of the data storage device.

According to alternative embodiments, the invention provides numerous methods by which files of a client agent can be executed by a host device, and by which the client agent can establish communication with a server for the transfer of recovery-relevant data. In carrying out these and other recovery-related actions, embodiments of the present invention provide for asserting a degree of control over a host device while either concealing such control from a user of the host device, or alternatively displaying to the user a prompt and/or navigating a browser to a predetermined internet presence and displaying the same to the user.

Thus, the present invention in its numerous embodiments provides beneficial and novel apparatuses, systems, and methods for enabling the recovery of lost and/or stolen portable data storage devices, as well as of the valuable information stored thereon. The scope of the embodiments contemplated by the descriptions provided herein is intended to be supplemented by what one having ordinary skill in the art, aware of knowledge both existing and reasonably contemplated, would understand to be impliedly interchangeable features, structures, actions or other beneficial alternatives to those explicitly described herein.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that the method, system and apparatus of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. A recoverable data storage apparatus, comprising:
   a hand-portable housing including an input/output (I/O) port;
   a data storage means retained within the housing and operatively coupled with the input/output port; and
   a client agent embodied as device-executable code residing on the data storage means and configured, when executed by a host network-linked computing device that is external to the data storage apparatus, to cause the host device to poll a remote server, wherein the polling includes establishing a clandestine communication session with the remote server, transmitting to the remote server unique identification data of the data storage apparatus, and receiving from the remote server data indicating a possession status of the data storage apparatus, and wherein the client agent includes each of an executable file, an autorun file, and an identification file.

2. The apparatus of claim 1, wherein the I/O port is configured to operatively couple either directly or indirectly with a corresponding I/O port of the host device.

3. The apparatus of claim 1, wherein the I/O port comprises a universal serial bus (USB) connector.

4. The apparatus of claim 1, wherein the data storage means comprises one selected from the group consisting of a solid-state memory device, a hard drive-based memory device, and an optical media-based memory device.

5. The apparatus of claim 1, wherein the client agent is further configured, upon receiving from the server possession status data indicating a lost or stolen possession status, to transmit host device identity-relevant data to the server.

6. The apparatus of claim 1, wherein the recoverable data storage apparatus is configured as any one of or any combination of devices selected from the group consisting of a digital audio player, a digital video player, a telephonic communication device, a solid-state memory-based data storage device, a portable hard drive-based data storage device, an optical media-based data storage device, a personal digital assistant (PDA), a digital camera, a digital photo display device, a digital recorder, and a data storage card device.

7. A system for recovering a lost or stolen data storage device, comprising:
a hand-portable data storage device configured to operatively couple with a host device that is external to the data storage device, the data storage device including a client agent embodied as executable code stored at a memory means of the data storage device and configured to poll a server device for possession status-relevant data when the data storage device is either directly or indirectly coupled with the host device, and wherein the code of the client agent is executable by an operation of the host device, wherein polling the server device comprises causing the host device to establish a clandestine data transmission portal and to transmit portable data storage device-identifying data to the server device, wherein the client agent includes each of an executable file, an autorun file, and an identification file, wherein the server device is operatively coupled with a network means and includes a device tracking means embodied as device executable code stored at a memory means of the server device, and wherein the device tracking means is configured, in response to polling by the client agent, to cause the server device to transmit portable data storage device possession status-relevant data to the portable data storage device via the network means.

8. The system of claim 7, wherein the portable data storage device operatively couples with the host device by an input/output (I/O) port.

9. The system of claim 8, wherein the I/O port is configured as a universal serial bus (USB) connector.

10. The system of claim 7, wherein the client agent is configured, in response to receiving possession-relevant data indicating that the storage device is lost or stolen, to cause the network means to transmit host device-relevant identifying data to the server device.

11. The system of claim 10, wherein the host device-relevant identifying data comprises at least one selected from the group consisting of a public IP address corresponding to the host device, a username of a user of the host device, an owner of the host device, an internal network address for the host device, a physical location identifier for the host device, a proprietary network node address for the host device, and a telephonic access number corresponding to the host device location.

12. The system of claim 10, wherein the server device is configured, upon receiving host device-relevant identifying data, to access a data source including cross-referencing means configured to identify a host-device location indicator comprising at least one selected from the group consisting of a physical address, a host name, a host device owner, a username of a host device user, a geographical coordinate, and a public IP address owner, corresponding to at least a portion of the host device-relevant identifying data.

13. The system of claim 7, wherein the server device is configured, upon receiving host device-relevant identifying data, to transmit data corresponding to the host-device location indicator to one or more of the portable data storage device owner, a law enforcement entity, and a security agency.

14. The system of claim 7, wherein the server device is configured to store at a memory means a record of received host device-identifying data and portable data storage device-identifying data.

15. The system of claim 7, wherein the client agent is further configured to establish an http connection with the server device via a random I/O port of the host device if the client agent is unable to establish a connection with the server device via internet browser software of the host device.

16. The system of claim 7, wherein the portable data storage device is configured as any one of or any combination of devices selected from the group consisting of a digital audio player, a digital video player, a telephonic communication device, a solid-state memory-based data storage device, a portable hard drive-based data storage device, an optical media-based data storage device, a personal digital assistant (PDA), a digital camera, a digital photo display device, a digital recorder, and a data storage card device.

17. The system of claim 7, wherein the portable data storage device is configured to enable wireless data transfer with the host device.

* * * * *